E. E. Clarke.
Pasteboard Cutting Mach.
Nº 16,719.                    Patented Mar. 3, 1857.

UNITED STATES PATENT OFFICE.

E. E. CLARKE, OF NEW HAVEN, CONNECTICUT.

MACHINE FOR CUTTING PASTEBOARD FOR BOXES.

Specification of Letters Patent No. 16,719, dated March 3, 1857.

*To all whom it may concern:*

Be it known that I, ELIZUR E. CLARKE, of the city and county of New Haven, in the State of Connecticut, have invented a new and useful Improvement in Machinery for Cutting Pasteboard for Boxes, &c.; and I do hereby declare that the following is a full, clear, and exact description of the construction, character, and operation of the same, reference being had to the accompanying drawings, which make a part of this specification, in which—

Figure 1:
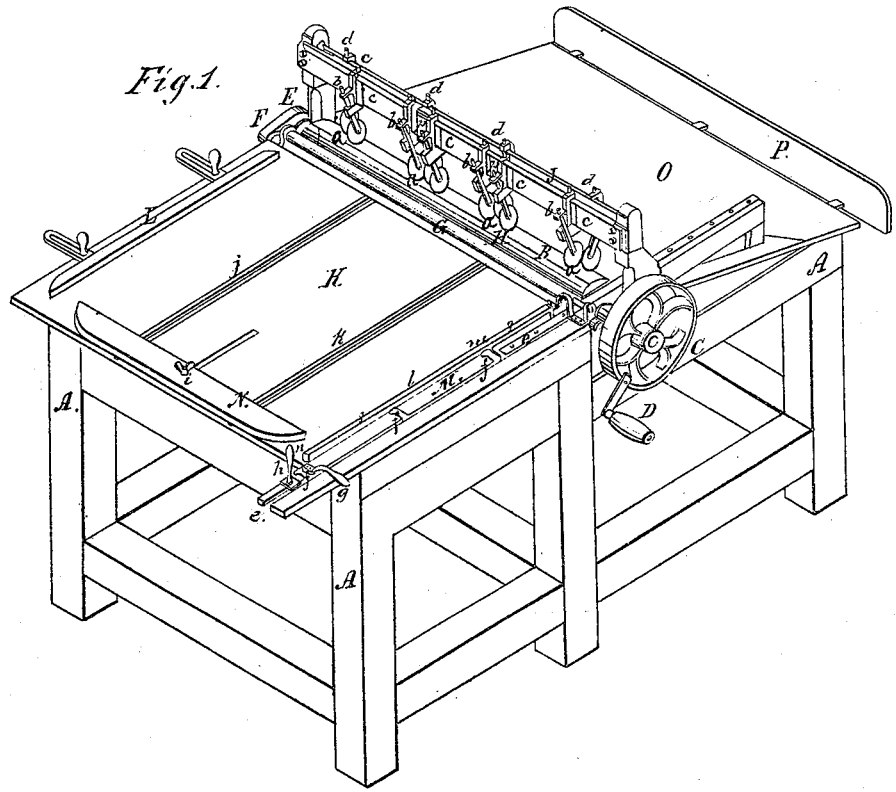
Figure 2:
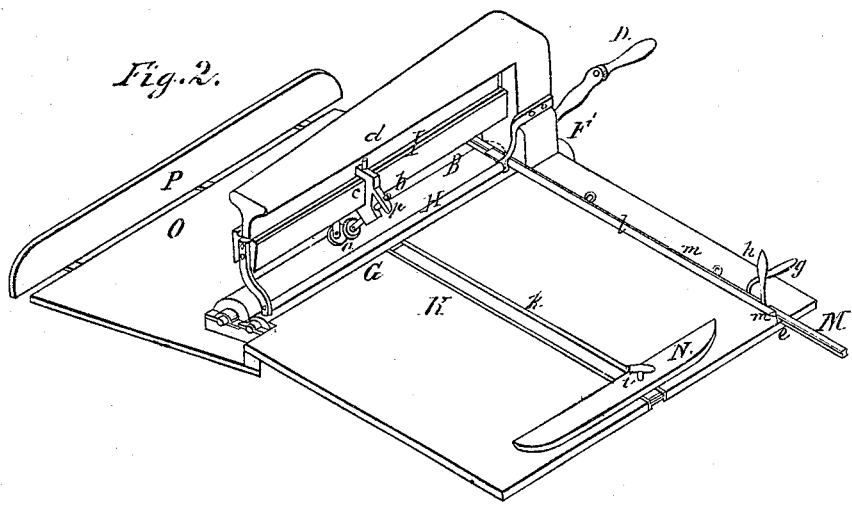

Figure 1, is a perspective view of the machine complete, and ready for use. Fig. 2, is a perspective view of the upper part of the machine, showing the upper feeding roller suspended from above; and without the guide, L.

My improvement consists in so constructing, and supporting the adjustable cutters, that they will serve to cut paste-board, of any thickness, and to any required depth, (either to separate it, or to only score, or crease it, so as to allow it to bend, to form the corners of boxes,) with the utmost accuracy; and also to cut it of any desired width, perfectly parallel, and at right angles to any determined line;—and in the method of adjusting, holding, and feeding, the sheets of paste-board, by means of adjustable guides, and a sliding clamp.

I make the frame, A, A, A, of the machine, of wood, or any other suitable material, substantially, as shown in Fig. 1.

I make the main cylinder, B, of cast iron, or any other suitable material, either hollow, or solid, as may be deemed best, in any case, and of a size suited to the kind of work, or size of the machine, (say from four to eight inches in diameter,) and have journals on its ends, to rest in proper bearings, as shown in Figs. 1 and 2.

On one of the journals, I fit a pulley, C, which may be worked by a crank, D, or by a band, as may be found most convenient. And on the other journal I also fit a pulley, E, of the same diameter, to carry the feeding rollers, (when used,) by a band, as at F, or, the pulleys and band may be at the other end, as shown at F′, Fig. 2.

I make the feeding rollers, G, H, of iron, or any other suitable material, and of a size proportioned to the main cylinder, B, as seen in the drawings; and I work them for feeding, (when used,) by the band, F, or F′, working on the pulley on the end of the roller, G, (of the same diameter as the roller,) as seen in the drawings. And the roller, H, is supported in free bearings attached to the frame, as shown in Fig. 1, or attached to the beam, I, as shown in Fig. 2, and it revolves by friction in the usual way, as its weight presses it down onto the pasteboard. But the machine may be worked without the feeding rollers, if thought best, at any time.

I make the cutters, a, a, &c., of cast steel, of a perfect circle, on their peripheries, and convex on both sides, so as to give strength and steadiness to them;—and I secure them in the holders by joint pins, or axes, in the usual ways, (as seen in the drawings,) so that they may revolve with freedom.

I make the cutter holders, b, b, &c., of iron, or any other suitable material, with a slot in one of their ends to receive the circular cutters, as shown at a, a, &c., and with a male screw on the other end, to receive two nuts (one each side of the arm, p,), by which the cutter is to be adjusted to its proper distance from the main cylinder, as shown at b, b, &c., and to hold them perfectly steady in their position. I fit these cutter holders into iron stocks, c, c, &c., by letting them into the stock from one side, (into dovetail grooves, and the male screws through holes in the arms p) in such a manner that they may be called right hand, and left hand, cutters, (that is, I let a part of them into one side, and a part into the other side, as shown in the drawings,) so that if a right hand and a left hand cutter come together by the sides into which the holders are fitted, the holders will come together, and thereby bring the cutters very near each other; (which is often very important, for small or shallow boxes;) but if put together the other way, a part of the stock will be between the holders, and therefore, the cutters must be at considerable distance from each other, but will answer for larger work. I attach these stocks, c, c, &c., to both sides of an iron beam, I, as shown in the drawings, so as to hold the stocks perfectly rigid, by means of binding screws, d, d, &c., or otherwise. I set these cutter holders, b, b, &c., obliquely in their stocks, as shown in the drawings, so that the stocks may be secured to either side of the beam, I, and yet bring the cutters essentially in a line over the highest part of the cylinder, B, by which means I am able to cut the pasteboard for the smallest, and shallowest boxes.

I make the table, K, on which I feed the pasteboard, flat, and on a level with the top of the main cylinder, B, (and feeding roller, G.) And on one end I fit an adjustable bar, L, to serve as a guide, (when necessary,) to direct the sheet of paste-board at right angles to the cylinder; and at the other end of this table, K, I fit a sliding spring clamp, as shown at M. The under part of this clamp, M, slides in a grooved way, as shown at e, e, on which it may be moved longitudinally, either by hand, or by the force of the feeding rollers, or by the revolving of the main cylinder under the cutters, acting to feed the sheet. The upper or vibratory, part of this clamp, is pressed down by springs, as shown at f, f, f, (or by any other suitable means,) with sufficient force to hold the paste-board firmly; and it is opened to receive, or release, it by depressing the end of the lever, g, and the clamp is drawn back by the handle, h, to receive another sheet, and so on.

On the same end of the table, (K,) with the spring clamp, (M,) I suspend a bar, l, beveled, or rounded, on one edge, as seen at n, to guide the uneven edge of the sheet into the clamp. And to the side of this bar, l, I attach a drop guide, m, which, (when the clamp is not needed,) may be forced down onto the surface of the table and serve as a guide, (like, L,) which may sometimes save the trouble of altering the position of the cutter stock on the beam, I. But this guide, m, is always drawn up out of the way, when the spring clamp, M, is used.

On the front edge of the table, K, I have another adjustable guide, N, (which is at right angles to the guide, L, and m, and the clamp, M,) to guide the sheet while being passed into the spring clamp, M.

This guide, N, may be adjusted to any desired position, and secured there by the set screw, i, it being kept in its right angled position by the slides, or tongues, j, and k.

Having made, and arranged the several parts of the machine, as before described, and having adjusted the cutters, so that the proper ones will cut the pasteboard nearly through, (for separating it,) while others will only score it, (to allow it to bend for the corners of the boxes,) and also having adjusted the cutter stocks, on both sides of the beam, I, so that the cuts will be at the required distance from each other for the size, and shape, of the boxes intended,—I feed the sheet of pasteboard onto the table, K, through the feeding rollers, G and H, (if they are used,) to the main cylinder and cutters, (governing one edge of the sheet by the guide, L, or m, when used, or put one edge into the spring clamp, M, as hereafter described,) when the cylinder will carry it through, and the revolving cutters will cut it into strips of the proper width, and also cut the gains, or scores, to the proper depth. When I have thus cut the desired quantity in one direction, I adjust the stocks to their proper planes for cutting the sheet, at right angles; and I feed the sheet, for that purpose, by bringing the edge against, the guide, N, and passing one end, under the bar, l, into the spring clamp, M, which, (by means of the springs, f, f, and f,) will hold the sheet steady while passing through and being cut in that direction, (that is, at right angles to the former cuts.) And when the clamp, M, has passed as far as it is necessary to guide the sheet, I press down the end of the lever, g, and thus open the clamp, M, and release the sheet, and allow it to pass through. By the means of this clamp, M, I save the trouble of squaring the end of the sheet by some other means, as it would be necessary to do to pass the sheet through at right angles when governed by the guide, L, or m.

O, is an inclined table, and P, is a movable stop, to receive and retain the pasteboard as it passes through.

What I claim as my invention, and desire to secure by Letters Patent, is—

1. The method of attaching, and adjusting, the cutters, in combination with the main cylinder, when the whole is constructed, arranged, and made to operate, substantially, as herein described.

2. I also claim the combination of the spring clamp, (M,) with the main cylinder and cutters, when constructed, and made to operate, substantially as herein described.

ELIZUR E. CLARKE.

Witnesses:
CHAS. R. FAY,
R. FITZGERALD.